April 2, 1935.  C. B. COATES  1,996,460
VENTILATED INDUCTION MOTOR
Filed March 31, 1933  2 Sheets-Sheet 1
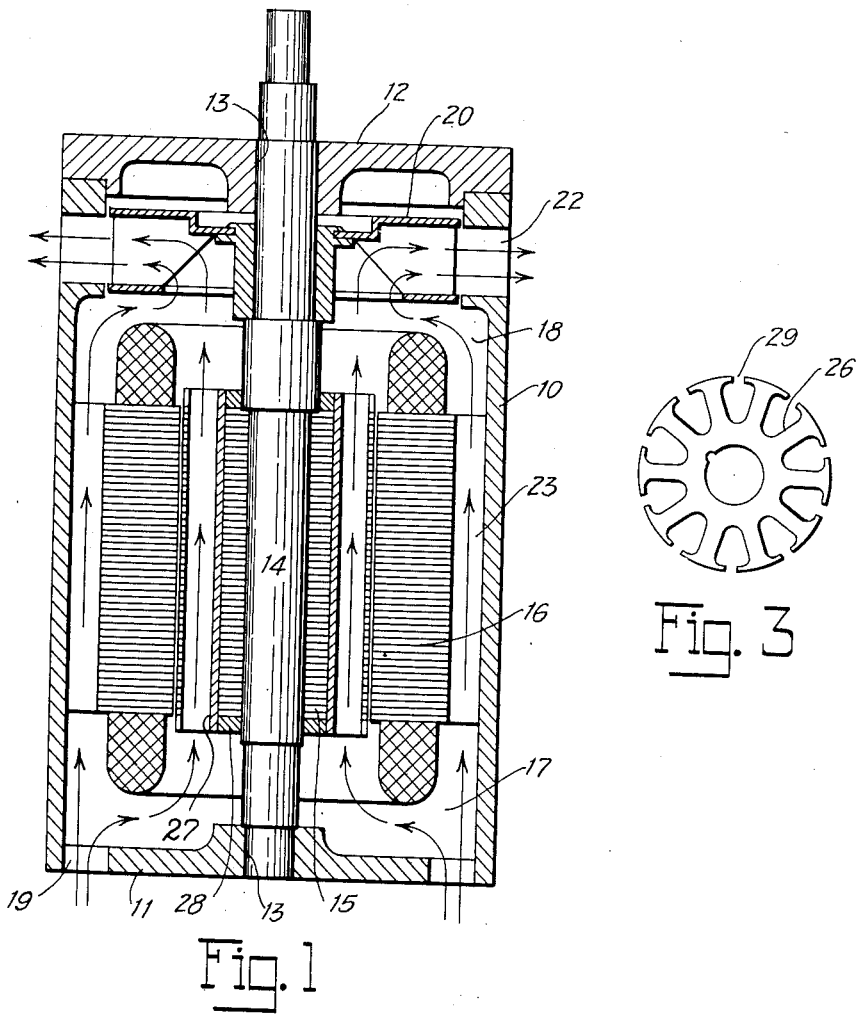
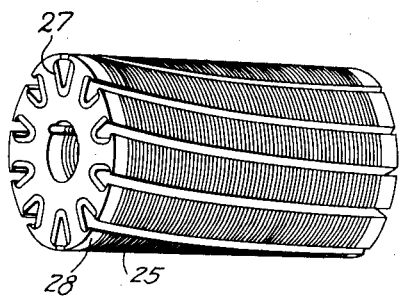
INVENTOR.
Charles B. Coates
BY
Raymond G. Mullee
ATTORNEY.

April 2, 1935.  C. B. COATES  1,996,460
VENTILATED INDUCTION MOTOR
Filed March 31, 1933   2 Sheets-Sheet 2

INVENTOR.
Charles B. Coates
BY
Raymond G. Mullee
ATTORNEY.

Patented Apr. 2, 1935

1,996,460

UNITED STATES PATENT OFFICE 1,996,460

VENTILATED INDUCTION MOTOR

Charles B. Coates, Cleveland, Ohio, assignor to Chicago Pneumatic Tool Company, New York, N. Y., a corporation of New Jersey Application March 31, 1933, Serial No. 663,747

3 Claims. (Cl. 172—120)

This invention relates to motors and has particular reference to the construction of a rotor of the built-up type in which the conductors and end rings are welded or brazed together.

An object of the invention is to provide circulation of air over the surfaces of the conductors or bars of the rotor. Another object is to increase the surface of the conductor in contact with the circulating air. A further object is to provide an improved cooling effect of the rotor and stator without impairing the operation of the motor or weakening the rotor structure. Other objects will appear more clearly from the description which follows.

The invention comprises forming the rotor with built-in cooling features. These features include an interrupted exterior surface on the rotor to form a series of channels communicating with slots or troughs in the respective conductors. The combined areas of the troughs and channels form passages which permit the ready flow of air. Preferably the conductors consist of a substance having high conductivity, such as copper, whereby the area of the troughs may be increased at the expense of the conductor area. The air passages are regularly spaced about the periphery of the rotor and are preferably spiralled so that when the rotor turns it has an effect of an air screw in aiding to force air from one end of the rotor to the other.

To induce circulation of air through the passages in the rotor, an impeller or fan may be provided. As a further development of the invention, the fan may be so constructed that it draws air through passages in the rotor and stator respectively, which passages are kept out of communication with each other. By separating the impeller mechanism for the stator from the impeller for the rotor, less difficulty is encountered in properly proportioning the areas of the respective passages to accomplish the desired flow of air through the rotor.

Referring to the drawings, Fig. 1 is a section of a motor embodying one form of the invention;

Fig. 2 is an isometric view of the rotor shown in Fig. 1;

Fig. 3 is a view in side elevation of one of the plates which make up the laminated core;

Figure 4:
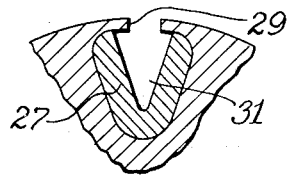
Fig. 4 is a detail sectional view showing part of a rotor of the form shown in Fig. 2.
Figure 5:
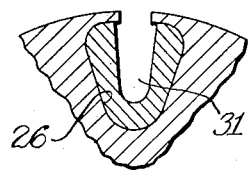
Fig. 5 is a view similar to Fig. 4, but showing the conductor in a somewhat modified shape.

Referring to Fig. 1, a motor casing 10 of cylindrical form is provided at one end with an end plate 11, and at the other end with a closure 12. The end plate and closure are perforated at 13 to provide bearings for a rotor shaft 14. The motor proper comprises the rotor 15 keyed to the shaft 14, and the stator 16, which surrounds the rotor and is supported by the casing 10. At the opposite ends of the motor, air chambers 17 and 18 are provided, the former communicating with atmosphere through the ports 19 in the end plate. Adjacent to the air chamber 18 is situated the impeller or fan 20, keyed to the rotor shaft and being arranged to draw air from the chamber 18 and expel the same through ports 22 on the circumference of the casing. Suitable passages 23 between the casing and stator provide a flow of cooling air over the stator windings. The rotor 15, as shown in Fig. 2, comprises a laminated core 25 each plate of which is perforated or otherwise cut away as indicated at 26 (Fig. 3) to receive the bars or windings 27 which extend beyond the full length of the core and terminate in end rings 28. Slots 29 extend from the perforations 26 to the periphery of the core plates. The end rings 28 are similar in cross-section to the core plates and receive the bars 27, the ends of the bars being flush with the plates. The conductor bars and end plates are preferably made of copper and are welded or brazed to each other. In accordance with the present invention the conductors do not occupy the entire area of the perforations 26 but are grooved to provide troughs or channels 31 in communication with slots 29 in the core plates and end rings. To illustrate the various possible forms these troughs may take, they are shown in Fig. 4 as V shaped and in Fig. 5 as substantially U shaped. The high conductivity of the copper permits of a large area of the troughs without making the resistance of the conductors too high. The bars 27 and consequently the perforations 26 are regularly spaced about the circumference of the core and while they are illustrated as being somewhat spiralled, they may be straight, if so desired.

In operation, the fan draws air from one end of the rotor along the slots 29 and troughs 27 to the other end of the rotor. It will be readily apparent that the moving air is in contact with the copper bars over a large area, and that the additional area provided by the slots 29 increases the circulation of air. Furthermore, the rotation of the rotor has the effect of an air screw in augmenting the flow of air through the spiral grooves. The direction of the spiral formed by the copper bars and of the blades of the fan, is preferably such that the air is drawn through the ports 19 into the chamber 17, forced through the troughs and slots of the rotor into the air chamber 18 from whence the air is drawn or removed by the fan. The latter, at the same time draws air through passages 23 for the stator.

Figure 6:
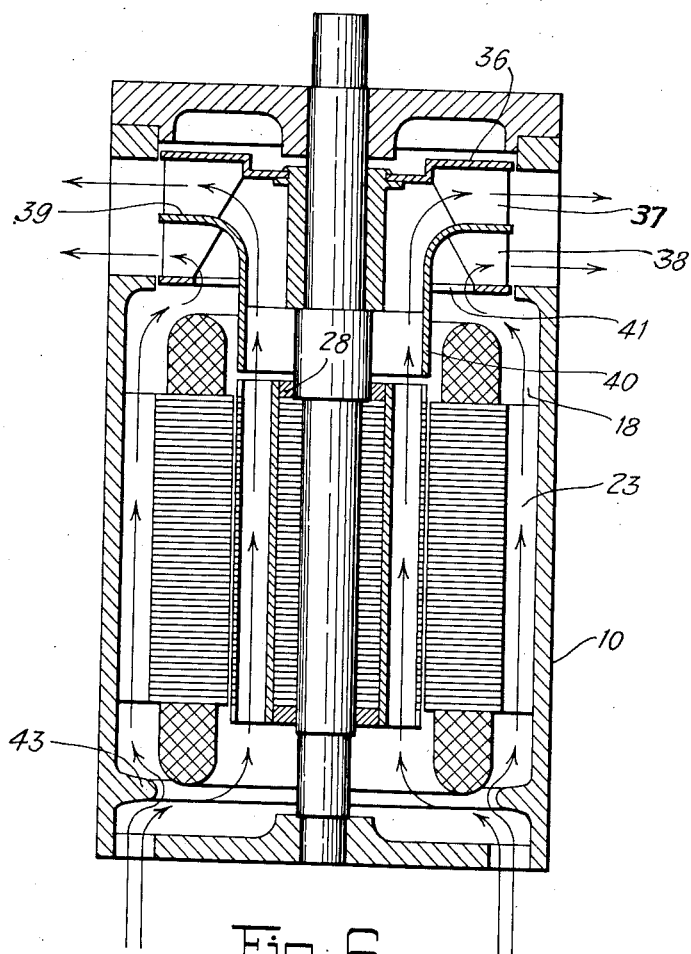
Fig. 6 is a section similar to Fig. 1 but illustrating a modification of the fan and of the motor casing.

In the embodiment of the invention shown in Fig. 6, the construction is the same as in Fig. 1 except as to the fan and casing. Consequently description of Fig. 6 will be limited to these features. The modified fan 36 comprises two sets of blades 37 and 38 separated from each other by a plate 39. This plate is provided with a skirt 40 which extends into the air chamber 18 and terminates just short of the end ring 28 of the rotor. The skirt 40 is at least equal in diameter to the rotor and provides therewithin a passage leading from the rotor to the fan blades 37. The inside area of the skirt 40 is out of communication with passage 41 leading from the stator to the fan blades 38. As a result of this construction, the passages 23 extending between the stator and casing may be made as large as desired without reducing the pressure difference between the ends of the rotor.

As an additional or alternative means of properly proportioning the air between the stator and rotor passages, respectively, the casing 10 may be provided with an inwardly projecting annular flange 43 which deflects the incoming air toward the passages in the rotor, partially at the expense of circulation through the stator passages 23.

While the invention has been disclosed in several illustrated embodiments, it will be apparent that other modifications and changes not specifically described herein can be made without departing from the spirit of the invention or the scope of the appended claims.

I claim as my invention:

1. An induction motor comprising a rotor of cylindrical shape, conductor bars extending lengthwise of the rotor near its periphery, passages in said bars and communicating with other passages between the bars and the periphery of the rotor, a stator closely surrounding the rotor and enclosed within a casing, a chamber at each end of the rotor and within said casing, the passages being open-ended and in communication with both chambers, means for maintaining a pressure difference between the air in both chambers, whereby to cause circulation of air lengthwise of said rotor passages, additional passages for cooling the stator and means for diverting incoming air toward the rotor passages, said last mentioned means comprising a flange on the inner wall of the casing projecting toward the end of the stator and restricting the opening for air leading to the stator passages.

2. An induction motor comprising a rotor having a laminated core made up of a series of plates having perforations extending therethrough, said plates each having restricted slots extending between said perforations and the periphery of the core, a series of spaced conductor bars embedded in said core, each conductor being confined entirely within its associated perforation and having no part extending within said restricted slot, each conductor having an open trough or substantially V-shaped groove therein, said trough having its maximum width at the outer end thereof which width is no less than the width of the restricted slot whereby to afford free circulation of air from the trough to the periphery of the core, end rings for the rotor having perforations and restricted slots connecting said perforations to the peripheries of the end rings, the ends of the conductors being received within the perforations in the end rings, said end rings and conductors being composed of copper and being mechanically secured together by brazing or welding, said conductors, slots and troughs being arranged spirally along the circumference of the core, and impeller means for forcing air through said troughs and restricted slots.

3. An induction motor comprising a rotor having a laminated core made up of a series of plates having perforations extending therethrough, said plates each having restricted slots extending between said perforations and the periphery of the core, each conductor being confined entirely within its associated perforation and having no part extending within said restricted slot, each conductor having an open trough or groove therein, said trough having a width at the outer end thereof no less than the width of the restricted slot whereby to afford free circulation of air from the trough to the periphery of the core, end rings for the rotor having perforations and restricted slots connecting said perforations to the peripheries of the end rings, the ends of the conductors being received within the perforations in the end rings, said conductors being composed of copper and mechanically secured to said end rings by brazing or welding, and means for inducing circulation of air lengthwise of the core through said troughs and restricted slots and over the circumferential surface of the core.

CHARLES B. COATES.